(12) United States Patent
Park et al.

(10) Patent No.: US 9,158,460 B2
(45) Date of Patent: Oct. 13, 2015

(54) SELECTING DATA NODES USING MULTIPLE STORAGE POLICIES IN CLOUD STORAGE SYSTEM

(75) Inventors: Chang-Sik Park, Seoul (KR); Eo-Hyung Lee, Gyeonggi-do (KR); Jin-Kyung Hwang, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 177 days.

(21) Appl. No.: 13/455,269

(22) Filed: Apr. 25, 2012

(65) Prior Publication Data

US 2012/0272025 A1  Oct. 25, 2012

(30) Foreign Application Priority Data

Apr. 25, 2011 (KR) .......................... 10-2011-0038437

(51) Int. Cl.
| | | |
|---|---|---|
| G06F 12/00 | (2006.01) | |
| G06F 3/06 | (2006.01) | |
| G06F 11/14 | (2006.01) | |
| G06F 11/20 | (2006.01) | |

(52) U.S. Cl.
CPC .............. *G06F 3/0608* (2013.01); *G06F 3/065* (2013.01); *G06F 3/067* (2013.01); *G06F 3/0614* (2013.01); *G06F 11/1446* (2013.01); *G06F 11/1448* (2013.01); *G06F 11/2094* (2013.01); *G06F 2206/1012* (2013.01)

(58) Field of Classification Search
CPC .. G06F 3/067; G06F 11/1446; G06F 11/1448
USPC .......................................................... 711/162
See application file for complete search history.

(56) References Cited

U.S. PATENT DOCUMENTS

| | | |
|---|---|---|
| 4,714,992 A | 12/1987 | Gladney et al. |
| 5,200,963 A | 4/1993 | Chau et al. |
| 5,315,601 A | 5/1994 | Lee et al. |
| 5,757,783 A | 5/1998 | Eng et al. |
| 5,907,671 A | 5/1999 | Chen et al. |
| 5,909,540 A | 6/1999 | Carter et al. |
| 6,192,365 B1 | 2/2001 | Draper et al. |
| 6,785,838 B2 | 8/2004 | Lim et al. |
| 7,177,866 B2 | 2/2007 | Holenstein et al. |
| 7,650,328 B2 | 1/2010 | Hori et al. |
| 7,701,925 B1 | 4/2010 | Mason et al. |
| 7,739,233 B1 | 6/2010 | Ghemawat et al. |
| 7,823,009 B1 | 10/2010 | Tormasov et al. |
| 7,853,770 B2 | 12/2010 | Tajima et al. |

(Continued)

FOREIGN PATENT DOCUMENTS

| | | |
|---|---|---|
| JP | 2008-059438 A | 3/2008 |
| KR | 10-1993-0007928 B1 | 8/1993 |

(Continued)

*Primary Examiner* — Aimee Li
*Assistant Examiner* — Prasith Thammavong
(74) *Attorney, Agent, or Firm* — IP Legal Services, LLC

(57) ABSTRACT

Provided are a method and a server for selecting data nodes for storing an object and replicas thereof in a cloud storage system having a plurality of data nodes grouped in a plurality of storage areas. The method may include selecting at least one storage area for storing the object and the replicas thereof sequentially with a locality policy, a low-cost policy, a load-balancing policy, and a space-balancing policy and selecting at least one data node from the selected at least one storage area sequentially using a load-balancing policy and a space-balancing policy.

18 Claims, 4 Drawing Sheets

(56) References Cited

U.S. PATENT DOCUMENTS

| | | |
|---|---|---|
| 8,103,636 B2 | 1/2012 | Lee et al. |
| 8,521,687 B2 | 8/2013 | Colbeck et al. |
| 2002/0055924 A1 | 5/2002 | Liming |
| 2002/0065919 A1 | 5/2002 | Taylor et al. |
| 2004/0064633 A1 | 4/2004 | Oota |
| 2004/0111441 A1 | 6/2004 | Saito et al. |
| 2005/0125456 A1 | 6/2005 | Hara et al. |
| 2005/0256923 A1 | 11/2005 | Adachi |
| 2005/0283487 A1 | 12/2005 | Karlsson et al. |
| 2006/0047751 A1 | 3/2006 | Chen et al. |
| 2006/0069828 A1 | 3/2006 | Goldsmith |
| 2006/0200488 A1 | 9/2006 | Chu-Carroll et al. |
| 2007/0300220 A1 | 12/2007 | Seliger et al. |
| 2008/0005199 A1 | 1/2008 | Chen et al. |
| 2008/0021935 A1 | 1/2008 | Geelen et al. |
| 2008/0059704 A1* | 3/2008 | Kavuri .................... 711/117 |
| 2008/0317068 A1 | 12/2008 | Sagar et al. |
| 2009/0077099 A1 | 3/2009 | Haustein et al. |
| 2009/0089499 A1* | 4/2009 | Abe et al. ................ 711/112 |
| 2009/0144422 A1 | 6/2009 | Chatley et al. |
| 2009/0144579 A1 | 6/2009 | Swanson |
| 2009/0171891 A1 | 7/2009 | Nochimowski et al. |
| 2009/0171911 A1 | 7/2009 | Nochimowski et al. |
| 2009/0172050 A1 | 7/2009 | Nochimowski et al. |
| 2009/0172217 A1 | 7/2009 | Nochimowski et al. |
| 2009/0172274 A1 | 7/2009 | Nochimowski et al. |
| 2009/0172275 A1 | 7/2009 | Nochimowski et al. |
| 2009/0172276 A1 | 7/2009 | Nochimowski et al. |
| 2009/0172400 A1 | 7/2009 | Rave et al. |
| 2009/0172694 A1 | 7/2009 | Nochimowski et al. |
| 2009/0210742 A1 | 8/2009 | Adarshappanavar et al. |
| 2009/0260005 A1 | 10/2009 | Nakagawa et al. |
| 2010/0058341 A1 | 3/2010 | Jung et al. |
| 2010/0076933 A1 | 3/2010 | Hamilton et al. |
| 2010/0161759 A1 | 6/2010 | Brand |
| 2010/0185537 A1 | 7/2010 | Bari |
| 2010/0262717 A1 | 10/2010 | Critchley et al. |
| 2010/0274762 A1 | 10/2010 | Murphy et al. |
| 2010/0274983 A1* | 10/2010 | Murphy et al. ............ 711/162 |
| 2010/0318609 A1 | 12/2010 | Lahiri et al. |
| 2010/0325199 A1 | 12/2010 | Park et al. |
| 2010/0332530 A1 | 12/2010 | McKelvie et al. |
| 2010/0333116 A1 | 12/2010 | Prahlad et al. |
| 2011/0145638 A1 | 6/2011 | Syrgabekov et al. |
| 2011/0202741 A1 | 8/2011 | Tajima et al. |
| 2012/0079499 A1* | 3/2012 | Gold et al. ................ 718/105 |
| 2012/0185641 A1 | 7/2012 | Nochimowski et al. |
| 2012/0226712 A1* | 9/2012 | Vermeulen et al. .......... 707/770 |
| 2014/0379966 A1 | 12/2014 | Nochimowski et al. |

FOREIGN PATENT DOCUMENTS

| | | |
|---|---|---|
| KR | 10-1993-0023826 A | 12/1993 |
| KR | 10-2001-0091593 A | 10/2001 |
| KR | 10-2004-0028594 A | 4/2004 |
| KR | 10-2005-0033615 A | 4/2005 |
| KR | 10-2007-0012544 A | 1/2007 |
| KR | 10-2007-0032734 A | 3/2007 |
| KR | 10-0719285 B1 | 5/2007 |
| KR | 10-2007-0067069 A | 6/2007 |
| KR | 10-2007-0108133 A | 11/2007 |
| KR | 10-2009-0036276 A | 4/2009 |
| KR | 10-2009-0062747 A | 6/2009 |
| KR | 10-0923394 B1 | 10/2009 |
| KR | 10-0931260 B1 | 12/2009 |
| KR | 10-2010-0025980 A | 3/2010 |
| KR | 10-2010-0055297 A | 5/2010 |
| KR | 10-2010-0060304 A | 6/2010 |
| KR | 10-2010-0060715 A | 6/2010 |
| KR | 10-2010-0069234 A | 6/2010 |
| KR | 10-2010-0070443 A | 6/2010 |
| KR | 10-2010-0073154 A | 7/2010 |
| KR | 10-2010-0092850 A | 8/2010 |
| KR | 10-2010-0107479 A | 10/2010 |
| KR | 10-0985169 B1 | 10/2010 |
| KR | 10-2010-0122197 A | 11/2010 |
| KR | 10-2010-0137323 A | 12/2010 |
| KR | 10-1023585 B1 | 3/2011 |
| WO | 2010/026366 A1 | 3/2010 |

* cited by examiner

SELECTING DATA NODES USING MULTIPLE STORAGE POLICIES IN CLOUD STORAGE SYSTEM

CROSS REFERENCE TO PRIOR APPLICATIONS

The present application claims priority under 35 U.S.C. §119 to Korean Patent Application No. 10-2011-0038437 (filed on Apr. 25, 2011), which is hereby incorporated by reference in its entirety.

The subject matter of this application is related to U.S. patent application Ser. No. 13/341,341 (filed on Dec. 20, 2011) and U.S. patent application Ser. No. 13/334,710 (filed on Dec. 22, 2011), the teachings of which are incorporated herein in their entirety by reference.

FIELD OF THE INVENTION

The present invention relates to cloud storage systems, and more particular, to data node selection in a cloud storage system.

BACKGROUND OF THE INVENTION

A cloud storage system may store an object and replicas thereof in a plurality of data nodes in response to a user request. The object may be any type of data. For example, the object may be document files and multimedia files. The document files may include Microsoft (MS) word documents or Portable Document Format (PDF) files. The multimedia files may include audio files for songs and image files for still and/or motion pictures. The present invention, however, is not limited thereto.

For many purposes, such as high reliability and availability, a cloud storage system may create replicas of the object and distributedly store the replicas in a plurality of data nodes. In order to effectively store the object and the replicas thereof, a cloud storage system may refer to multiple cloud storage policies to select areas and data nodes for storing the object and the replicas thereof. The cloud storage policies may define storage locations and rules for storing the object and the replicas. The cloud storage polices may include an area diversity policy, and a locality policy.

SUMMARY OF THE INVENTION

This summer is provided to introduce a selection of concepts in a simplified form that are further described below in the detailed description with reference to the drawings. This summary is not intended to identify key features or essential features of the claimed subject matter, nor is it intended to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, a storage area and a data node may be selected using multiple storage policies in a cloud storage system.

In accordance with another aspect of the present invention, a storage area for storing an object received from a user may be selected based on a locality policy.

In accordance with another aspect of the present invention, a storage area for storing replicas of an object may be selected sequentially using a low-cost policy, a load-balancing policy, and a space-balancing policy in a defined order.

In accordance with another aspect of the present invention, a data node for storing an object and replicas thereof may be selected sequentially using a load-balancing policy and a space-balancing policy in a defined order.

In accordance with an embodiment of the present invention, a method may be provided for selecting data nodes for storing an object and replicas thereof in a cloud storage system having a plurality of data nodes grouped in a plurality of storage areas. The method may include selecting at least one storage area for storing the object and the replicas thereof sequentially with a locality policy, a low-cost policy, a load-balancing policy, and a space-balancing policy and selecting at least one data node from the selected at least one storage area sequentially using a load-balancing policy and a space-balancing policy.

The selecting the at least one storage area may include selecting a storage area for an object received from a user based on the locality policy.

The selecting the storage area may include obtaining location information from a user terminal of a user request for the cloud storage system to store the object, detecting a current location of the user terminal based on the obtained location information, and selecting a storage area comparatively close to the detected current location of the user terminal.

The selecting the at least one storage area may include selecting storage areas to store the replicas by sequentially applying the low-cost policy, the load-balancing policy, and the space-balancing policy.

The selecting storage areas to store the replicas may include selecting first candidate storage areas, excluding a storage area selected for the original object, from the plurality of storage areas included in the cloud storage system by applying the low-cost policy, selecting second candidate storage areas from the first candidate storage area by applying the load-balancing policy, and then selecting a final candidate storage from the second candidate storage area by applying the space-balancing policy.

The selecting the first candidate storage areas may include determining presence or absence of first storage areas having network latency lower than a related threshold in the cloud storage system excluding the storage area selected for the original object, determining the storage area of the first storage areas, when present, having network latency lower than the related threshold as the first candidate storage, otherwise, selecting N storage areas having comparatively low network latency as the first candidate storage when the first storage areas are absent. N may be an integer number equal to or greater than 1.

The determining the presence or absence of first storage areas in the cloud storage system may include measuring network latency of each storage area for a certain period time, calculating average network latency of each storage area based on the measured network latencies, comparing the average network latency of each storage area with a certain latency threshold, and including a storage area having the average network latency lower than the certain latency threshold the first storage areas based on the comparison result.

The selecting the second candidate storage areas may include determining whether the first candidate storage areas include second storage areas having an area average processing load smaller than a related threshold, detecting the second storage areas having the area average processing load smaller than the related threshold as the second candidate storage areas when the first candidate storage areas include the second storage areas, and otherwise, selecting N storage areas having comparatively low area average processing load as the second candidate storages. N may be an integer number equal to or greater than 1.

The determining whether the first storage areas include second storage areas may include measuring a processing load of each data in the first storage areas for a certain period time, calculating an area average processing load of each one of the first storage areas based on the measured processing loads, comparing the area average processing load of each storage area with a certain threshold, and including a storage area having the area average processing load lower than the certain threshold in the second storage areas based on the comparison result.

The selecting a final candidate storage from the second candidate storage areas may include selecting a storage area having a highest availability rate from the second candidate storage areas as the final storage area. An availability rate of a storage area may denote an available storage space with respect to a total storage space of the storage area.

The selecting at least one data node from the selected at least one storage area may include selecting first candidate data nodes by applying a load-balancing policy, and selecting a final data node from the first candidate data nodes by applying a space-balancing policy.

The selecting first candidate data odes may include determining whether the selected storage area includes first data nodes having an average processing load smaller than a related threshold, setting the first data nodes having the average processing load smaller than the related threshold as the first candidate data nodes when the selected storage area include the first data nodes, and selecting N data nodes having comparatively low average processing load as the first candidate data nodes when the selected storage area excludes the first data nodes. N may be an integer number equal to or greater than 1.

The determining whether the selected storage area includes the first data nodes may include measuring a processing load of each one of the first data nodes for a certain period time, calculating an average processing load of each one of the first data nodes based on the measured processing loads, comparing the average processing load of each one of the first data nodes with a certain threshold, and including a data node having the average processing load lower than the certain threshold in the first candidate data nodes based on the comparison result.

The selecting a final data node from the first candidate data nodes by applying a space-balancing policy may include selecting a data node having a highest availability rate from the first candidate data node s as the final data node, and storing one of the replicas in the final data node. An availability rate of a data node may denote an available storage space in respect to a total storage space of the data node.

In accordance with another embodiment of the present invention, a server may be provided for selecting data nodes for storing an object and replicas thereof in a cloud storage system having a plurality of data nodes grouped in a plurality of storage areas. The server may include a storage area selection unit and a data node selection unit. The storage area selection unit may be configured to select at least one storage area for storing the object and the replicas thereof sequentially with a locality policy, a low-cost policy, a load-balancing policy, and a space-balancing policy. The data node selection unit may be configured to select at least one data node from the selected at least one storage area sequentially using a load-balancing policy and a space-balancing policy.

The storage area selection unit may include a locality policy unit. The locality policy unit may be configured to obtain location information from a user terminal of a user request for the cloud storage system to store the object, to detect a current location of the user terminal based on the obtained location information, and to select a storage area comparatively close to the detected current location of the user terminal.

The storage area selection unit may include a low-cost policy unit, an area load-balancing policy unit, and an area space-balancing policy unit. The low-cost policy unit may be configured to select first candidate storage areas, excluding a storage area selected for the original object, from the plurality of storage areas included in the cloud storage system by applying the low-cost policy. The area load-balancing policy unit may be configured to select second candidate storage areas from the first candidate storage area by applying the load-balancing policy. The area space-balancing policy unit may be configured to select a final candidate storage from the second candidate storage area by applying the space-balancing policy.

The low-cost policy unit may be configured to determine whether the cloud storage system includes, excluding the storage area selected for the original object, first storage areas having network latency lower than a related threshold, to determine the storage area having network latency lower than the related threshold as the first candidate storages when the cloud storage system include the first storage areas, otherwise, to select N storage areas having comparatively low network latency as the first candidate storage.

The area load-balancing policy unit may be configured to determine whether the first candidate storage areas include second storage areas having an area average processing load smaller than a related threshold, to determine the second storage areas having the area average processing load smaller than the related threshold as the second candidate storage areas when the first candidate storage areas include the second storage areas, otherwise, select N storage areas having comparatively low area average processing load as the second candidate storages.

The area space-balancing policy unit may be configured to select a storage area having a highest availability rate from the second candidate storage areas as the final storage area. N may be an integer number equal to or greater than 1, and an availability rate of a storage area may denote an available storage space with respect to a total storage space of the storage area.

The data node selection unit may include to a load-balancing policy unit and a space-balancing policy unit. The load-balancing policy unit may be configured to select first candidate data nodes by applying a load-balancing policy. The space-balancing policy unit may be configured to select a final data node from the first candidate data nodes by applying a space-balancing policy.

The load-balancing policy unit may be configured to determine whether the selected storage area includes first data nodes having an average processing load smaller than a related threshold, to set the first data nodes having the average processing load smaller than the related threshold as the first candidate data nodes when the selected storage area include the first data nodes, otherwise, to select N data nodes having comparatively low average processing load as the first candidate data nodes.

The space-balancing policy unit may be configured to select a data node having a highest availability rate from the first candidate data node s as the final data node and to store one of the replicas in the final data node. N may be an integer number equal to or greater than 1, and an availability rate of a data node may denote an available storage space in respect to a total storage space of the data node.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Figure 1:
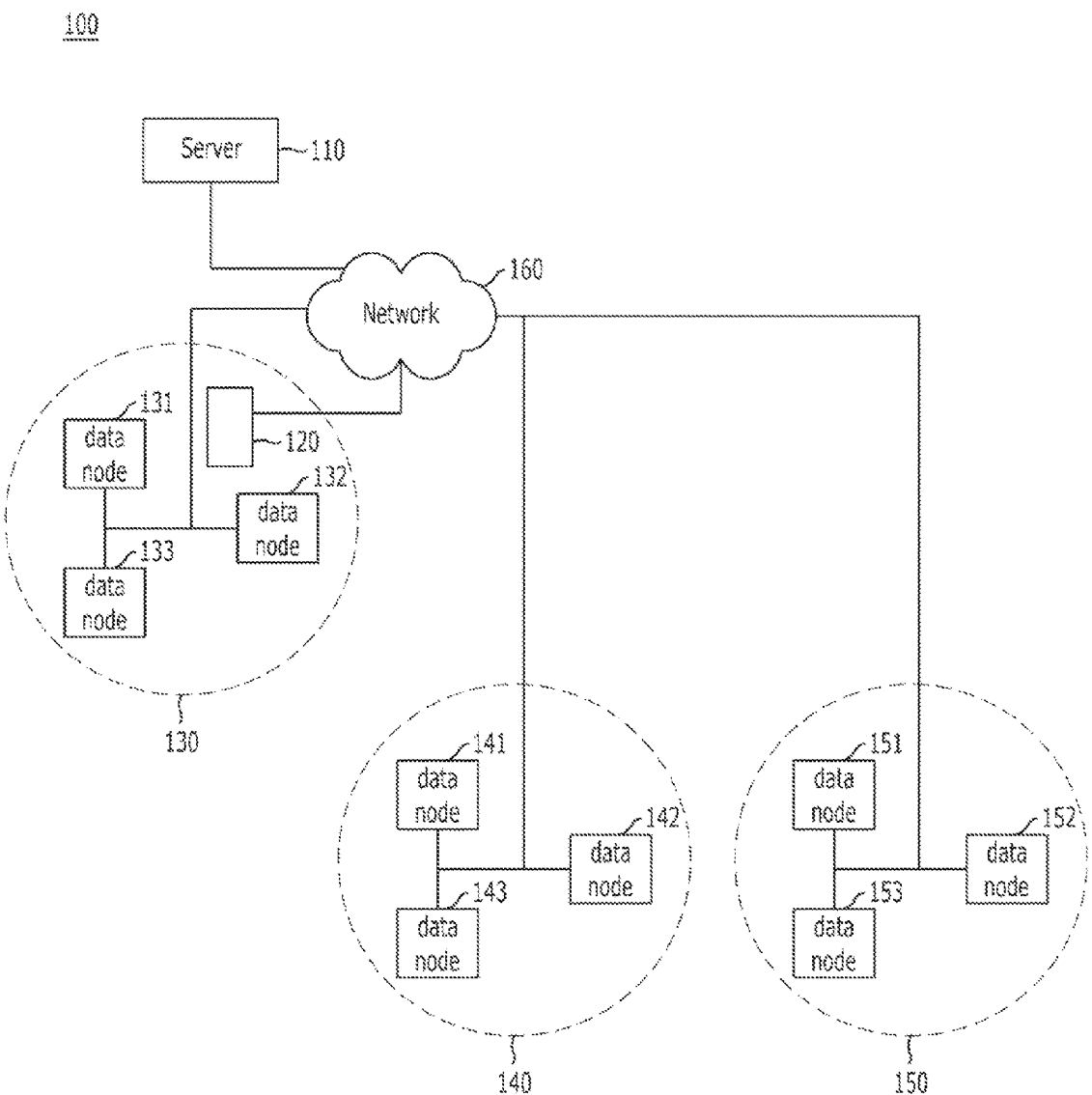
FIG. 1 shows a cloud storage system in accordance with an embodiment of the present invention.

Reference will now be made in detail to embodiments of the present invention, examples of which are illustrated in the accompanying drawings, wherein like reference numerals refer to like elements throughout. The embodiments are described below, in order to explain the present invention by referring to the figures.

In accordance with an embodiment of the present invention, a storage area and a data node may be selected by applying multiple storage policies in a cloud storage system. For high reliability and availability, the cloud storage system may refer to multiple cloud storage policies to select areas and data nodes for storing an object and replicas thereof. The cloud storage policies may define storage locations and rules for storing the object and the replicas. Particularly, a locality policy may be applied to select a storage area and a data node for selecting an original object received from a user. For storing replicas of the original object, a low-cost policy, a load-balancing policy, and a space-balancing policy may be sequentially applied to select a storage area and a data node. In addition, diversity policies might be used in conjunction with the described embodiments when selecting an original object received from a user based on the locality policy, and selecting areas and data nodes for storing an object and replicas thereof based on the load-balancing policy, space-balancing policy, and low-cost policy that are sequentially applied.

The area diversity policy may be a rule defined for distributing an object and replicas thereof in data nodes of at least N areas where N is a natural number greater than 1. Such an area diversity policy may improve storage safety and stability.

The locality policy may define a rule for selecting a data node in an area close to a user. According to the locality policy, a cloud storage system may select a data node relatively close to a related user. Because of the locality policy, the related user may access a desired object or a replica thereof more quickly.

The load-balancing policy may define a rule for uniformly balancing processing load, which are caused by a plurality of write or read requests from users, in data nodes. The space-balancing policy may define a rule for uniformly using storage resources distributed in areas, and the low-cost policy may define a rule for minimizing network cost such as network latency.

Hereinafter, a cloud storage system for optimally selecting a storage area and a data node by applying multiple storage policies in accordance with an embodiment of the present invention will be described with reference to FIG. 1.

FIG. 1 shows a cloud storage system in accordance with an embodiment of the present invention.

Referring to FIG. 1, cloud storage system 100 may include server 110, data nodes 131 to 133, 141 to 143, and 151 to 153, and network 160. The plurality of data nodes 131 to 133, 141 to 143, and 151 to 153 may be geographically distributed. Also, the plurality of data nodes 131 to 133, 141 to 143, and 151 to 153 may be coupled to network 160. User terminal 120 may be coupled to the plurality of data nodes 131 to 133, 141 to 143, and 151 to 153 through network 160. User terminal 120 may allow a user to input requests to retrieve or store data in accordance with described embodiments.

Server 110 may be coupled to plurality of data nodes 131 to 133, 141 to 143, and 151 to 153 through network 160. Server 110 may receive a request for a storage service with an object from user terminal 120. Upon the receipt of the request, server 110 may create a plurality of replicas thereof and distributedly store the object and the replicas thereof in plurality of data nodes 131 to 133, 141 to 143, and 151 to 153. Server 110 may refer to multiple storage policies, for example, an area diversity policy, a locality policy, a load-balancing policy, a space-balancing policy, and a low-cost policy, as described subsequently. Server 110 may be referred to as a proxy server or a storage service system platform.

Data nodes 131 to 133, 141 to 143, and 151 to 153, as shown in FIG. 1, may be geographically distributed over a plurality of areas 130, 140, and 150. For example, data nodes 131 to 133 may be located at first area 130, data nodes 141 to 143 may be located at second area 140, and data nodes 151 to 153 may be located at third area 150. First area 130 may be separated from second area 140 and third area 150 by a relatively long distance. For example, first area 130 may be Seoul, Korea, second area 140 may be Tokyo, Japan, and third area 150 may be New York, U.S.A., but embodiments are not limited thereto. Data nodes 131 to 133, 141 to 143, and 151 to 153 may store an object and replicas thereof in response to control of the server 110. Furthermore, data nodes 131 to 133, 141 to 143, and 151 to 153 may provide a stored object or a stored replica to a user in response to control of the server 110.

In an embodiment of the present invention, server 110 may effectively select data nodes and store the object and the replicas thereof in the selected data nodes. In order to selectively select optimal data nodes, server 110 may refer to multiple storage policies. Based on the multiple storage policies, server 110 may i) select a storage area and ii) select a data node from the selected storage area.

Referring to FIG. 1, server 110 may select at least one storage area among first area 130, second area 140, and third area 150 based on at least one of the cloud storage policies. For example, when server 110 selects first area 130, server 110 may select at least one data node from data nodes 131 to 133 for storing at least one of the object and the replicas.

Hereinafter, selecting a storage area is first described. In selecting a storage area for an object that is received from user terminal 120, server 110 may employ the locality policy. The object received from user terminal 120 may be referred to as an original object. After creating replicas of the original object, server 110 may sequentially employ a) the low-cost policy, b) load-balancing policy, and c) space-balancing policy to select storage areas for storing the replicas.

According to the locality policy, server 110 may select a storage area identical or relatively close to a location of user terminal 120 in order to store the original object. Since server 110 selects the area identical or relatively close to the location of user terminal 120, user terminal 120 may quickly access a data node that store the original object. Also, user terminal 120 can perform a write process and a read process at a relatively fast speed. Server 110 may detect a current location of user terminal 120 based on an Internet Protocol (IP) address and/or Global Positioning System (GPS) data, which are obtained from user terminal 120 that a user employs to access cloud storage system 100, but the present invention is not limited thereto. For example, server 110 may monitor the current location of user terminal 120 at a regular interval.

After selecting the storage area for the original object, server 110 may select storage areas for the replicas by sequentially employing i) the low-cost policy, the load-balancing policy, and ii) space-balancing policy. In order to apply such storage policies, server 110 may measure network latency of each storage area at a regular interval or in real time, calculate average network latency of each storage area based on the measured network latency, and store the calculated average network latency. Furthermore, server 110 may set a network latency threshold that indicates a latency level suitable for processing objects stored in data nodes from a certain distance.

Furthermore, server 110 may monitor processing loads of data nodes belonging to each area at a regular interval or in real time. Server 110 may calculate an area average processing load of each storage area based on the monitored processing loads of data nodes. Server 110 may set a load threshold for selecting a storage area.

In addition, server 110 may monitor an availability rate of each data node belonging to each storage area at a regular interval or in real time. Server 110 may calculate an average availability rate of each storage area based on the monitored availability rate of each data node. For example, the average availability rate of each storage area may be an average availability rate of data nodes included in a storage area. The availability rate may denote an available storage space with respect to a total storage space of a data node. Server 110 may set an availability threshold for selecting a storage area.

Server 110 may firstly apply the low-cost policy for selecting storage areas in order to store the replicas. Network latency may be the most important parameter for performing a write process and a read process associated with the replicas. Since network latency greatly varies according to areas, server 110 may select a storage area having low network latency according to the low-cost policy. For example, server 110 may select a storage area having network latency lower than the network latency threshold. If multiple storage areas are selected as candidate storage areas because multiple storage areas have network latency lower than the network latency threshold, server 110 may apply the load-balancing policy for selecting storage areas from the candidate storage areas.

According to the load-balancing policy, server 110 may select at least one storage area having an average processing load lower than a processing load threshold. If multiple storage areas are selected as candidate storage areas, server 110 may apply the space-balancing policy to select a final storage area among the candidate storage areas. That is, server 110 may select a storage area based on the highest area average availability rate as the final storage area. The availability rate may denote an available storage space in respect to a total storage space in a data node. The area average availability rate may be an average of availability rates of all data nodes included in a storage area.

As described above, server 110 may select a storage area for the original object based on the locality policy and select storage areas for the replicas thereof by sequentially applying the low-cost policy, the load-balancing policy, and the space-balancing policy.

Hereinafter, selecting a data node from the selected storage area will be described. After selecting the storage areas, server 110 may select at least one data node from the selected storage area based at the load-balancing policy and the space-balancing policy. The locality policy may not be referred to because the storage areas are already selected. Furthermore, the low-cost policy is not considered for selecting data nodes because data nodes in the same area may have similar network latency.

For example, server 110 may select data nodes included in the selected storage area by applying the load-balancing policy. That is, server 110 may select data nodes having a processing load less than a processing load threshold. If a plurality of data nodes are selected based on the load-balancing policy, server 110 may apply the space-balancing policy to select a final data node. That is, server 110 may select a data node having the highest availability rate among the data nodes selected based on the load-balancing policy. Hereinafter, server 110 will be described with reference to FIG. 2.

Figure 2:
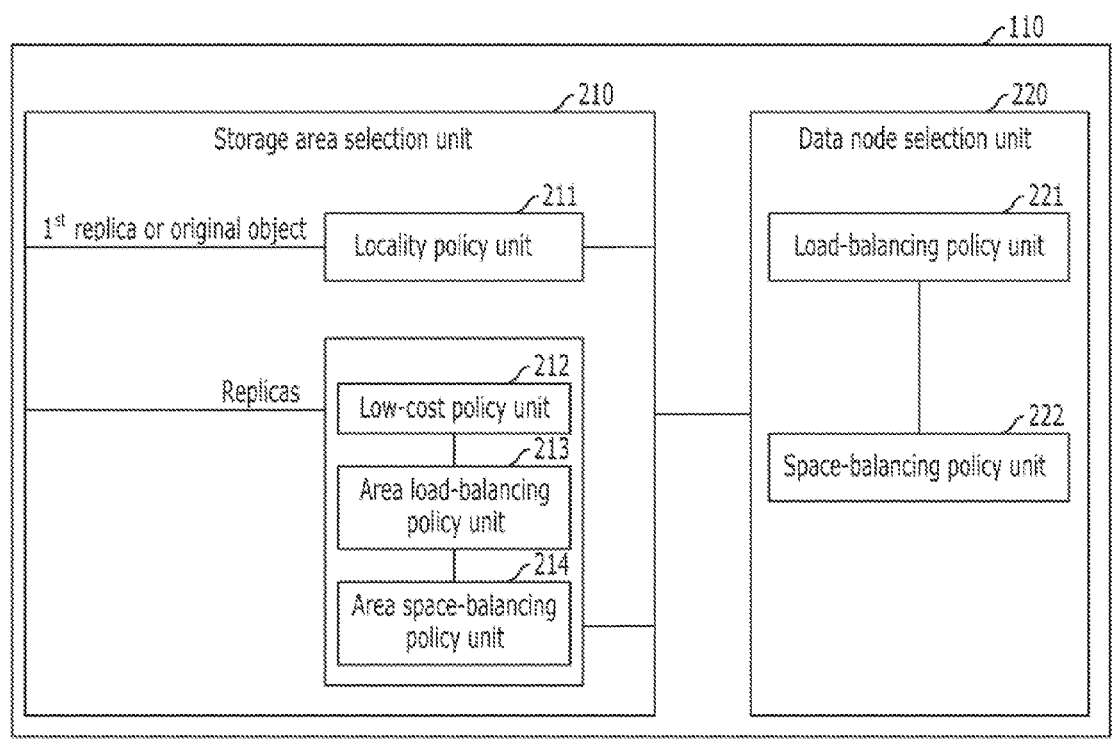
FIG. 2 shows a server in accordance with an embodiment of the present invention.

FIG. 2 shows a server in accordance with an embodiment of the present invention.

Server 110 may select storage areas and data nodes by sequentially applying multiple data storage policies in a defined order. Referring to FIG. 2, server 110 may include storage area selection unit 210 and data node selection unit 220.

Storage area selection unit 210 may select a plurality of storage areas in order to store an object and replicas thereof. Storage area selection unit 210 may include locality policy unit 211, low-cost policy unit 212, area load-balancing policy unit 213, and area space-balancing policy unit 214.

Locality policy unit 211 may select a storage area for the original object received from user terminal 120 by applying the locality policy. For example, locality policy unit 211 may determine a current location of user terminal 120. Locality policy unit 211 may obtain an IP address or GPS information of user terminal 120 to determine the current location of user terminal 120. Based on the determined location of user terminal 120, locality policy unit 211 may select a storage area near to the location of user terminal 120.

Low-cost policy unit 212 may select at least one storage area for storing the replicas by applying the low-cost policy. For example, low-cost policy unit 212 may determine whether cloud storage system 100 includes, except the storage area selected for the original object, any storage areas having network latency lower than a related threshold. Low-cost policy unit 212 may store an average value of network latency measured per each storage area. Furthermore, low-cost policy unit 212 may set the network latency threshold that indicates an appropriate latency level to process stored objects in a certain distance. Based on the determination result, low-cost policy unit 212 may select storage areas having the average value of the network latency smaller than the network latency threshold as first candidate storage areas.

Area load-balancing policy unit 213 may select at least one storage area from the first candidate storage areas by applying the load-balancing policy. Area load-balancing unit 213 may determine whether the first candidate storage areas include any storage area having an area average processing load smaller than a load threshold. For example, area load-balancing policy unit 213 may compare an area average processing load of each candidate storage area with a load threshold. Based on the comparison result, area load-balancing policy unit 212 may select at least one storage area as second candidate storage areas when a storage area having an average processing load is smaller than the load threshold.

Area space-balancing policy unit 714 may select one storage area, as a final storage area, from the second candidate storage areas by applying the space-balancing policy. For example, area space-balancing policy unit 214 may select a storage area having the highest availability rate from the second candidate storage areas.

Data node selection unit 220 may select at least one data node from the selected storage area. Data node selection unit 220 may include load-balancing policy unit 221 and space-balancing policy unit 222.

Load-balancing policy unit 221 may select at least one data node, as candidate data nodes, from the selected storage area by applying the load-balancing policy. Load-balancing policy unit 221 may compare an average processing load of each data node in the selected storage area with a first load threshold. Based on the comparison result, at least one data lode may be selected as candidate data nodes. Particularly, when a data node having an average processing load is smaller than the first load threshold, the data node may be selected as a candidate data node.

When a data node is not necessarily present having the average processing load smaller than the first load threshold, load-balancing policy unit 221 may determine whether the selected storage area includes any data nodes having an average processing load smaller than a second load threshold. That is, load-balancing policy unit 221 may use multiple thresholds for selecting data nodes having comparatively low processing load from the selected storage area. In this manner, load-balancing policy unit 221 may flexibly and dynamically select data nodes corresponding to various factors varying in cloud storage environment. The second load threshold may be greater than the first load threshold.

Space-balancing policy unit 222 may select a data node, as a final data node, from the candidate data nodes by applying the space-balancing policy. For example, space-balancing policy unit 222 may select a data node having the highest availability rate from the candidate data nodes. The replica may be stored in the final data node selected by space-balancing policy unit 222.

Hereinafter, a method for selecting storage areas and data nodes in cloud storage system in accordance with an embodiment of the present invention will be described with reference to FIG. 3A and FIG. 3B.

Figure 3A:
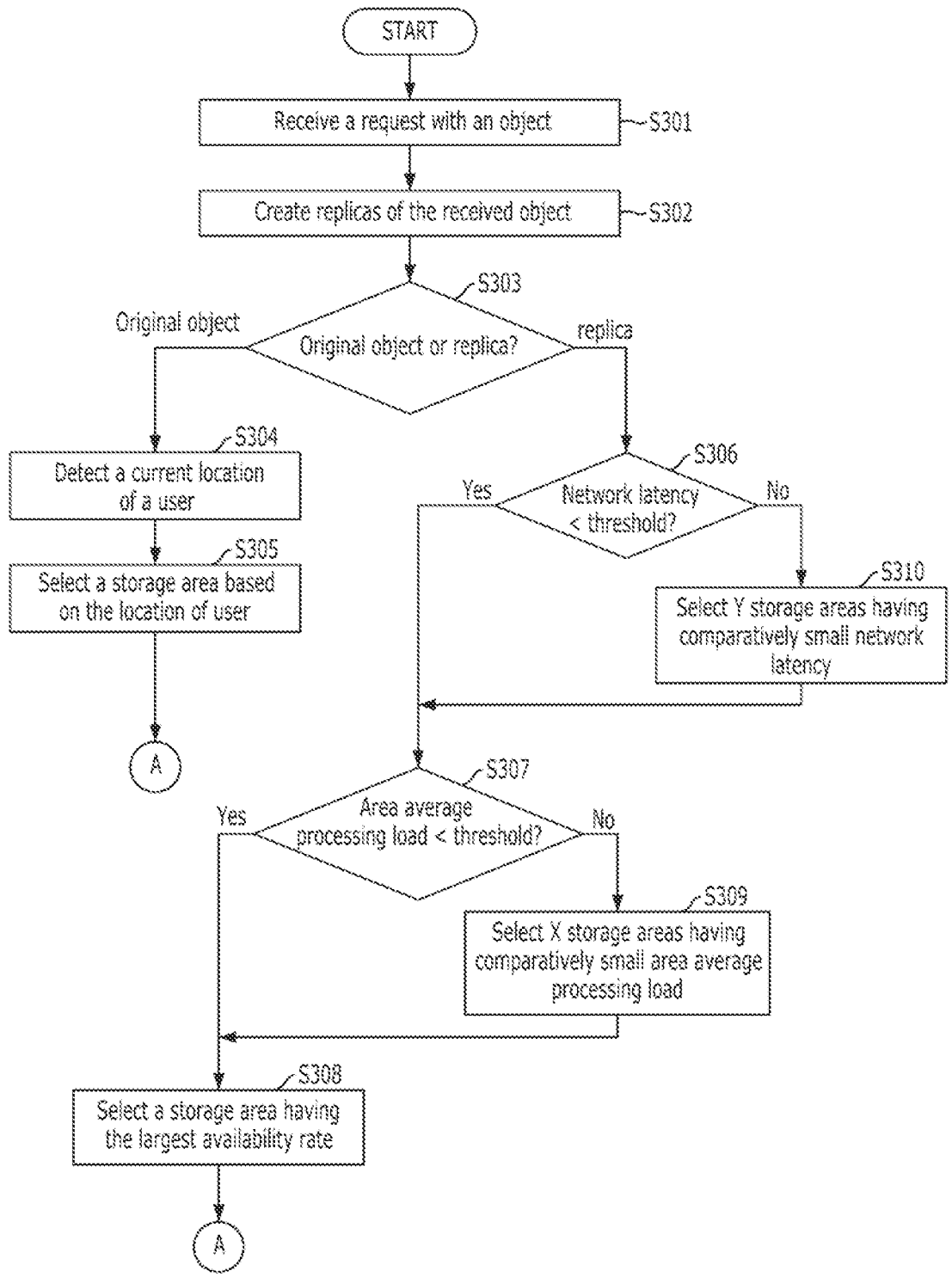
FIG. 3A shows a method for selecting storage areas based on multiple storage policies in cloud storage system in accordance with an embodiment of the present invention.

FIG. 3A shows a method for selecting storage areas based on multiple storage policies in a cloud storage system in accordance with an embodiment of the present invention.

Referring to FIG. 3A, a request for storing an object may be received at step S301. For example, server 110 may receive a request for storing from user terminal 120 with an object to store.

At step S302, a plurality of replicas may be created. For example, server 110 may create a plurality of replicas from the received object. Particularly, server 110 may divide the received object into a plurality of chunks and create replicas of each chunk. Specially, when a size of the received object is comparatively large, it may be required to divide the object into a plurality of chunks. The replica may be referred to as a data replica, a file replica, and a chunk replica.

After creating the plurality of replicas, storage areas and data nodes may be selected for storing the object and the replicas thereof. In order to select an optimal storage area and data node, multiple storage policies may be applied in accordance with an embodiment of the present invention.

At step S303, determination may be made as to whether a target object to store is the original object or the replicas thereof. For example, server 110 may determine whether a target object to store is the original object received from user terminal 120 or the replicas created from the original object.

When the target object is the original object (Original object—S303), a storage area for the original object may be selected based on the locality policy as follows. At step S304, a current location of the user may be determined. For example, server 110 may determine a current location of user terminal 120. Server 110 may obtain an IP address or GPS information of user terminal 120 to determine the current location of user terminal 120.

At step S305, a storage area may be selected based on the detected location of the user. For example, server 110 may select a storage area near to the location of user terminal 120. As shown in FIG. 1, user terminal 120 may be located within first storage area 130. According to the locality policy, server 110 may select first storage area 130 for storing the original object received from user terminal 120.

After selecting the storage area for the original object, server 110 may select a data node from data nodes belonging to the storage area. Selecting a data node will be subsequently described with reference to FIG. 3B.

When the target object is the replica (Replica—S303), server 110 may apply the low-cost policy to select a storage areas for the replicas from storage areas included in cloud storage system 100 as follows. At step S306, determination may be made as to whether cloud storage system 100 includes, except the storage area selected for the original object, any storage areas having network latency lower than a related threshold. For example, server 110 may determine whether cloud storage system 100 includes storage areas having network latency lower than a network latency threshold. Server 110 may store an average value of network latency measured per each storage area. Furthermore, server 110 may set the network latency threshold that indicates an appropriate latency level to process stored objects in a certain distance. The present invention, however, is not limited thereto. The average value of network latency may be calculated by other entity in cloud storage system 100 and provided to server 110. Furthermore, the network latency threshold may be set by other entity in cloud storage system 100 and provided to server 110.

When cloud storage system 100 includes storage areas having the average value of the network latency smaller than the network latency threshold (Yes—S306), the storage areas may be selected as first candidate storage areas. After selecting the first candidate storage areas, the load-balancing policy and the space-balancing policy may be applied as follows. At step S30, may be made as to whether the first candidate storage areas include any storage area having an area average processing load smaller than a load threshold. For example, server 110 may apply the load-balancing policy first. According to the load-balancing policy, server 110 may compare an area average processing load of each candidate storage area with a load threshold. Particularly, server 110 may monitor and measure a processing load of each data node in a storage area at a regular interval or in real time. Based on the measurement result, server 110 may calculate the area average processing load of each storage area and store the calculated area average processing load of each storage area. The area average processing load may be an average processing load of data nodes included in a storage area. Furthermore, server 110 may set a load threshold that indicates appropriate load level of a storage area to accept more objects to store. The present invention, however, is not limited thereto. The processing load may be monitored and measured in other entity in cloud storage system 100 and the monitored and measured result may be provided to server 110. The area average processing load of a storage area may be also calculated in other entity in cloud storage system 100 and provided to server 110. The load thresholds may be previously determined by other entity included in cloud storage system 100.

Based on the comparison result, at least one storage area may be selected as second candidate storage areas. Particularly, when a storage area having an average processing load is smaller than the load threshold, the storage area may be selected as a second candidate storage area.

When cloud storage system 100 does not include storage areas having the average value of the network latency smaller than the network latency threshold (No—S306), the Y number of storage areas having a comparatively small network latency may be selected as the first candidate storage areas at step S310. For example, Y may be an integer number equal to or greater than 1. Sever 110 may select storage areas having the smallest network latency to $Y^{th}$ smallest network latency. After selecting the first candidate storage areas, the load-balancing policy and the space-balancing policy may be applied as described above. For example, at step S307 determination may be made as to whether the first candidate storage areas include any storage area having an area average processing load smaller than a load threshold.

When the first candidate storage areas include storage areas having the area average processing load smaller than the load threshold (Yes—S307), the space-balancing policy may be applied to select a final storage area to store the replicas as follows. At step S308, a storage area having a highest availability rate may be selected among the second candidate storage areas, as a final storage area. For example, server 110 may select a storage area having the highest availability rate from the second candidate storage areas. In accordance with an embodiment of the present invention, server 110 may monitor an availability rate of each data node in second candidate storage area. Server 110 may calculate an average availability rate based on the monitoring result. The availability rate of a storage area may denote an average availability rate of data nodes in the storage area. The availability rate of a storage area may denote an available storage space in respect to a total storage space of cloud storage system 100. The present invention, however, is not limited thereto. The availability rate may be monitored and measured in other entity in cloud storage system 100 and the monitored and measured result may be provided to server 110. The average availability rate of a storage area may be also calculated in other entity in cloud storage system 100 and provided to server 110.

When the first candidate storage areas do not include storage areas having the area average processing load smaller than the load threshold (No—S307), the X number of storage areas having a comparatively small area average processing load may be selected as the second candidate storage areas at step S309. For example, X may be an integer number equal to or greater than 1. Sever 110 may select storage areas having the smallest area average processing load to $X^{th}$ smallest area average processing load. After selecting the second candidate storage areas, the space-balancing policy may be applied as described above. For example, at step S308, a storage area having the highest availability rate may be selected among the second candidate storage areas, as a final storage area.

As described above, the storage areas for storing the original object or the replicas thereof may be selected based on the locality policy, the low-cost polity, the load-balancing policy, and the space-balancing policy. After selecting the final storage areas, at least one data node may be selected from the final storage areas. Hereinafter, a method for selecting a data node in accordance with an embodiment of the present invention will be described with reference to FIG. 3B.

Figure 3B:
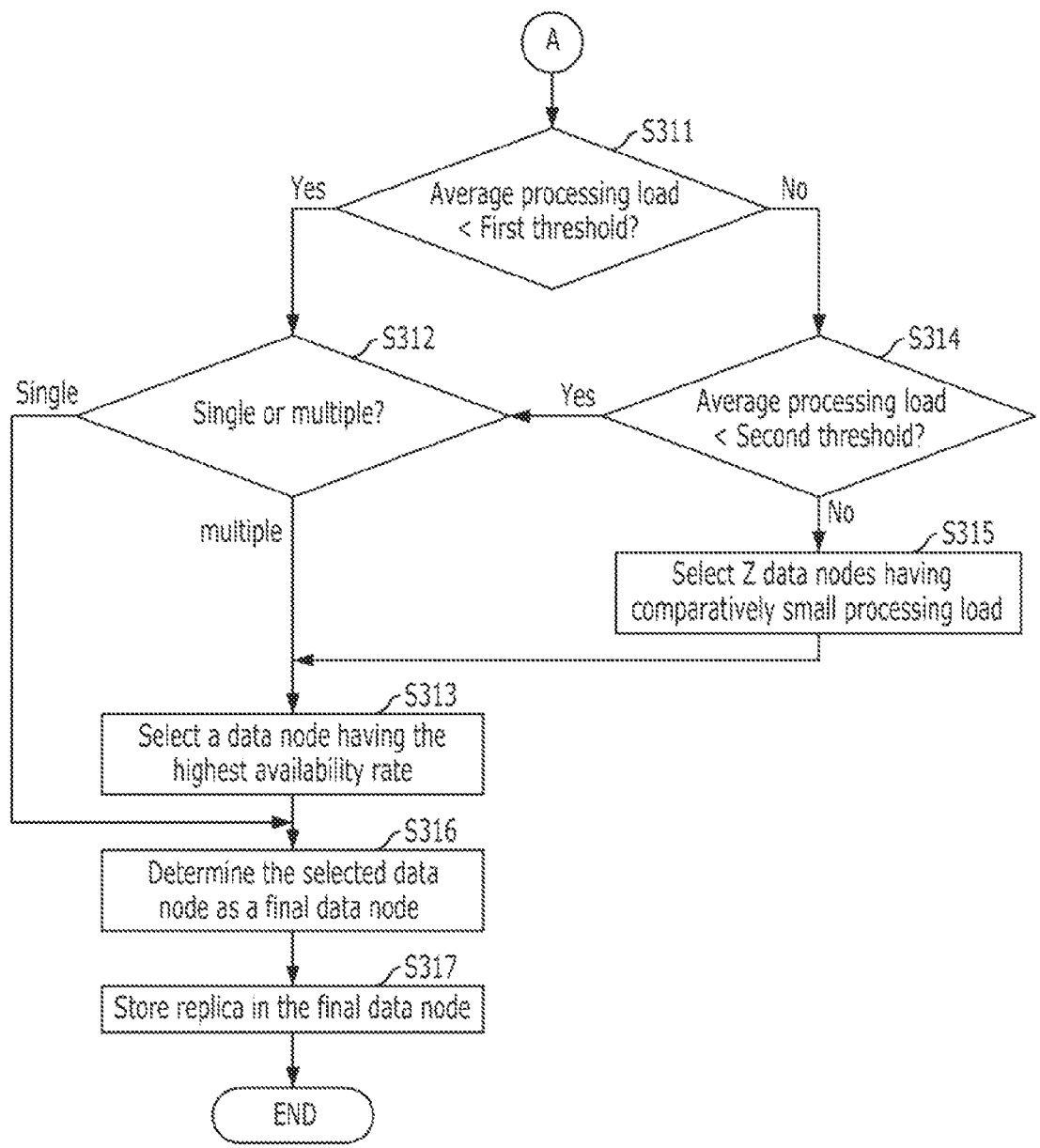
FIG. 3B shows a method for selecting a data node from a selected storage area in accordance with an embodiment of the present invention.

FIG. 3B shows a method for selecting a data node from a selected storage area in accordance with an embodiment of the present invention.

In order to select a data node, a load-balancing policy and a space-balancing policy may be sequentially applied. In accordance with an embodiment of the present invention, multiple load thresholds may be used to find data nodes having comparatively tow processing load. This embodiment will be described as using first load threshold and second load threshold, but the present invention is not limited thereto. In accordance with another embodiment of the present invention, more than two thresholds or single threshold may be used to select at least one data node having comparatively low processing load.

Referring to FIG. 3B, determination may be made as to whether the selected storage area includes any data nodes having an average processing load smaller than a first load threshold at step S311. For example, server 110 may apply the load-balancing policy to select candidate data nodes from the selected storage area. According to the load-balancing policy, server 110 may compare an average processing load of each data node in the selected storage area with a first load threshold. Particularly, server 110 may monitor and measure a processing load of each data node at a regular interval or in real time. Based on the measurement result, server 110 may calculate the average processing load of each data node and store the calculated average processing load of each data node. Furthermore, server 110 may set at least one load threshold that indicates an appropriate load level of a data node to accept more objects to store. The present invention, however, is not limited thereto. The processing load may be monitored and measured in a data node or other server and the monitored and measured result may be provided to server 110. The average processing load of a data node may be also calculated in a data node or other server and provided to server 110. The load thresholds may be previously determined by other entity included in cloud storage system 100.

Based on the comparison result, at least one data node may be selected as candidate data nodes. Particularly, when a data node having an average processing load is smaller than the first load threshold, the data node may be selected as a candidate data node. In this manner, server 110 may select a single data node or multiple data nodes from a plurality of data nodes included in the selected storage area.

At step S312, determination may be made whether a single data node is selected or multiple data nodes are selected as candidate data nodes (Yes—S311). For example, server 110 may determine whether a signal data node is selected or multiple data nodes are selected as candidate data nodes.

When the signal data node is selected (Single—S312), the selected data node may be determined as a final data node at step S316 and the object or the replica may be stored in the final data node at step S317. For example, server 110 may determine the selected single data node as the final data node at step S316. At step S317, server 110 may transmit the object or the replica to the final data node and the final data node may store the object or the replica.

When the multiple data nodes are selected (Multiple—S312), the space-balancing policy may be applied to select a final data node to store the original object or the replica thereof as follows. At step S313, a data node having the highest availability rate may be selected among the candidate data nodes. For example, server 110 may select a data node having the highest availability rate from the candidate data nodes. In accordance with an embodiment of the present invention, server 110 may monitor an availability rate of each data node included the selected storage area. Server 110 may calculate an average availability rate based on the monitoring result. The availability rate may denote an available storage space in respect to a total storage space of the selected data node. The present invention, however, is not limited thereto. The availability rate may be monitored and measured in a data node or other entity in cloud storage system 100 and the monitored and measured result may be provided to server 110. The average availability rate of a data node may be also calculated in a data node or other entity in cloud storage system 100 and provided to server 110.

After selecting the data node having the highest availability rate, the selected data node may be determined as a final data node at step S316. At step S317, the object or the replica may be stored in the final data node.

When there is no data node having the average processing load smaller than the first load threshold (No—S311), determination may be made as to whether the selected storage area includes any data nodes having an average processing load smaller than a second load threshold at step S314. For example, server 110 may compare an average processing load of each data node included in the selected storage area with the second load threshold. The second load threshold may be greater than the first load threshold.

When there is at least one data node having the average processing load smaller than the second load threshold (Yes—S314), determination may be made whether a single data node is selected or multiple data odes are selected as candidate data nodes at step S312. When the signal data node is selected (Single—S312), the selected data node may be determined as a final data node at step S316 and the object or the replica may be stored in the final data node at step S317. When the multiple data nodes are selected (Multiple—S312), the space-balancing policy may be applied to select a final data node to store the original object or the replica thereof. Particularly, at step S313, a data node having a highest availability rate may be selected among the candidate data nodes. At step S316, the selected data node may be determined as a final data node. At step S317, the object or the replica may be stored in the final data node.

When no data node is identified having the average processing load smaller than the second load threshold (No—S314), the Z number of data nodes may be selected as candidate data nodes at step S315. For example, Z is an integer number equal to and greater than 1. Server 110 may select Z data nodes each having a comparatively low processing load from data nodes located within the selected storage area. Particularly, server 100 may selected a data node having the smallest processing load to a data node having a $Z^{th}$ smallest processing load among data nodes included in the selected storage area.

After selecting the Z number of candidate data nodes, the space-balancing policy may be applied to select a final data node to store the original object or the replica thereof. Particularly, at step S313, a data node having a highest availability rate may be selected among the candidate data nodes. At step S316, the selected data node may be determined as a final data node. At step S317, the object or the replica may be stored in the final data node.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for selecting data nodes for storing an object from received from a user terminal and replicas of the received object in a cloud storage system having a plurality of data nodes grouped in a plurality of storage areas, the method comprising:
    selecting, by a server including at least one hardware processor, at least one storage area for storing the object and the replicas, wherein (i) a storage area for storing the object is selected as a storage area closest to a current location of the user terminal among the plurality of storage areas included in the cloud storage system, and (ii) storage areas for storing the replicas are selected by sequentially applying a low-cost policy, a first load-balancing policy, and a first space-balancing policy in a unit of storage area according to a first predetermined policy priority, among remaining storage areas excluding the storage area selected for the object, wherein in the first predetermined policy priority, the low-cost policy has a higher priority than the first load-balancing policy, and the first load-balancing policy has a higher priority than the first space-balancing policy; and
    selecting, by the server, at least one data node from the selected at least one storage area by sequentially applying a second load-balancing policy and a second space-balancing policy in a unit of data node according to a second predetermined policy priority, wherein in the second predetermined policy priority, the second load-balancing policy has a higher priority than the second space-balancing policy.

2. The method of claim 1, wherein the selecting the storage area includes:
    obtaining location information from the user terminal of a user request for the cloud storage system to store the object;
    detecting the current location of the user terminal based on the obtained location information; and
    selecting the storage area closest to the detected current location of the user terminal among the plurality of storage areas included in the cloud storage system.

3. The method of claim 1, wherein the selecting storage areas to store the replicas includes:
    selecting first candidate storage areas, excluding the storage area selected for the object, from the plurality of storage areas included in the cloud storage system by applying the low-cost policy;
    selecting second candidate storage areas from the first candidate storage area by applying the first load-balancing policy; and then
    selecting a final candidate storage from the second candidate storage area by applying the first space-balancing policy.

4. The method of claim 3, wherein the selecting the first candidate storage areas includes:
    determining presence or absence of first storage areas having network latency lower than a related threshold in the cloud storage system excluding the storage area selected for the object;
    determining the storage area of the first storage areas, when present, having network latency lower than the related threshold as the first candidate storage; and
    selecting N storage areas having comparatively low network latency as the first candidate storage when the first storage areas are absent,
    wherein N is an integer number equal to or greater than 1.

5. The method of claim 4, wherein the determining the presence or absence of first storage areas in the cloud storage system comprises:
    measuring network latency of each storage area for a certain period time;
    calculating average network latency of each storage area based on the measured network latencies;
    comparing the average network latency of each storage area with a certain latency threshold; and
    including a storage area having the average network latency lower than the certain latency threshold in the first storage areas based on the comparison result.

6. The method of claim 3, wherein the selecting the second candidate storage areas includes:
    determining whether the first candidate storage areas include second storage areas having an area average processing load smaller than a related threshold;
    detecting the second storage areas having the area average processing load smaller than the related threshold as the second candidate storage areas when the first candidate storage areas include the second storage areas;
    otherwise, selecting N storage areas having comparatively low area average processing load as the second candidate storages,
    wherein N is an integer number equal to or greater than 1.

7. The method of claim 6, wherein the determining whether the first storage areas include second storage areas includes:
    measuring a processing load of each data in the first storage areas for a certain period time;
    calculating an area average processing load of each one of the first storage areas based on the measured processing loads;
    comparing the area average processing load of each storage area with a certain threshold; and
    including a storage area having the area average processing load lower than the certain threshold in the second storage areas based on the comparison result.

8. The method of claim 3, wherein the selecting a final candidate storage from the second candidate storage areas includes:
    selecting a storage area having a highest availability rate from the second candidate storage areas as the final storage area, wherein an availability rate of a storage area denotes an available storage space with respect to a total storage space of the storage area.

9. The method of claim 1, wherein the selecting at least one data node from the selected at least one storage area includes:
    selecting first candidate data nodes by applying the second load-balancing policy; and
    selecting a final data node from the first candidate data nodes by applying the second space-balancing policy.

10. The method of claim 9, wherein the selecting first candidate data nodes includes:
    determining whether the selected storage area includes first data nodes having an average processing load smaller than a related threshold;
    setting the first data nodes having the average processing load smaller than the related threshold as the first candidate data nodes when the selected storage area includes the first data nodes; and
    selecting N data nodes having comparatively low average processing load as the first candidate data nodes when the selected storage area excludes the first data nodes,
    wherein N is an integer number equal to or greater than 1.

11. The method of claim 10, wherein the determining whether the selected storage area includes the first data nodes includes:
    measuring a processing load of each one of the first data nodes for a certain period time;
    calculating an average processing load of each one of the first data nodes based on the measured processing loads;
    comparing the average processing load of each one of the first data nodes with a certain threshold; and
    including a data node having the average processing load lower than the certain threshold in the first candidate data nodes based on the comparison result.

12. The method of claim 9, wherein selecting a final data node from the first candidate data nodes by applying the second space-balancing policy includes:
    selecting a data node having a highest availability rate from the first candidate data node s as the final data node; and
    storing one of the replicas in the final data node,
    wherein an availability rate of a data node denotes an available storage space in respect to a total storage space of the data node.

13. A server for selecting data nodes for storing an object from received from a user terminal and replicas of the received object in a cloud storage system having a plurality of data nodes grouped in a plurality of storage areas, the server comprising at least one hardware processor that executes:
    a storage area selection unit configured to select at least one storage area for storing the object and the replicas, wherein (i) a storage area for storing the object is selected as a storage area closest to a current location of the user terminal among the plurality of storage areas included in the cloud storage system, and (ii) storage areas for storing the replicas are selected by sequentially applying a low-cost policy, a first load-balancing policy, and a first space-balancing policy in a unit of storage area according to a first predetermined policy priority, among remaining storage areas excluding the storage area selected for the object, wherein in the first predetermined policy priority, the low-cost policy has a higher priority than the first load-balancing policy, and the first load-balancing policy has a higher priority than the first space-balancing policy; and
    a data node selection unit configured to select at least one data node from the selected at least one storage area by sequentially applying a second load-balancing policy and a second space-balancing policy in a unit of data node according to a second predetermined policy priority, wherein in the second predetermined policy priority, the second load-balancing policy has a higher priority than the second space-balancing policy.

14. The server of claim 13, wherein the storage area selection unit is configured to:
    obtain location information from the user terminal of a user request for the cloud storage system to store the object;
    detect the current location of the user terminal based on the obtained location information; and
    select the storage area closest to the detected current location of the user terminal among the plurality of storage areas included in the cloud storage system.

15. The server of claim 13, wherein the storage area selection unit is configured to perform:
    a low-cost policy execution procedure which selects first candidate storage areas, excluding the storage area selected for the object, from the plurality of storage areas included in the cloud storage system by applying the low-cost policy;
    an area load-balancing policy execution procedure which selects second candidate storage areas from the first candidate storage areas by applying the first load-balancing policy; and
    an area space-balancing policy execution procedure which selects a final candidate storage from the second candidate storage areas by applying the first space-balancing policy.

16. The server of claim 15, wherein:
    the low-cost policy execution procedure includes:
        determining whether the cloud storage system includes, excluding the storage area selected for the object, first storage areas having network latency lower than a related threshold;
        determining the storage area having network latency lower than the related threshold as the first candidate storages when the cloud storage system includes the first storage areas;
        otherwise, selecting N storage areas having comparatively low network latency as the first candidate storage,
    the area load-balancing policy execution procedure includes:
        determining whether the first candidate storage areas include second storage areas having an area average processing load smaller than a related threshold;
        determining the second storage areas having the area average processing load smaller than the related threshold as the second candidate storage areas when the first candidate storage areas include the second storage areas;
        otherwise, selecting N storage areas having comparatively low area average processing load as the second candidate storages, and
    the area space-balancing policy execution procedure includes:
        selecting a storage area having a highest availability rate from the second candidate storage areas as the final storage area,
    wherein N is an integer number equal to or greater than 1, and an availability rate of a storage area denotes an available storage space with respect to a total storage space of the storage area.

17. The server of claim 13, wherein the data node selection unit is configured to perform:

a load-balancing policy execution procedure which selects first candidate data nodes by applying the second load-balancing policy; and a space-balancing policy execution procedure which selects a final data node from the first candidate data nodes by applying the second space-balancing policy.

18. The server of claim 17, wherein:

the load-balancing policy execution procedure includes:
- determining whether the selected storage area includes first data nodes having an average processing load smaller than a related threshold;
- setting the first data nodes having the average processing load smaller than the related threshold as the first candidate data nodes when the selected storage area includes the first data nodes;
- otherwise, selecting N data nodes having comparatively low average processing load as the first candidate data nodes, and the space-balancing policy execution procedure includes:
- selecting a data node having a highest availability rate from the first candidate data node s as the final data node; and
- storing one of the replicas in the final data node, wherein N is an integer number equal to or greater than 1, and an availability rate of a data node denotes an available storage space in respect to a total storage space of the data node.

* * * * *